United States Patent
Harada et al.

[11] Patent Number: 6,020,089
[45] Date of Patent: *Feb. 1, 2000

[54] ELECTRODE PLATE FOR BATTERY

[75] Inventors: Keizo Harada; Masayuki Ishii; Kenichi Watanabe; Shosaku Yamanaka, all of Itami, Japan

[73] Assignee: Sumitomo Electric Industries, Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/542,016

[22] Filed: Oct. 12, 1995

[30] Foreign Application Priority Data

Nov. 7, 1994 [JP] Japan .................................... 6-272290
Jun. 26, 1995 [JP] Japan .................................... 7-159409

[51] Int. Cl.$^7$ .................................................. H01M 4/80
[52] U.S. Cl. .......................... 429/234; 429/235; 429/236; 429/237
[58] Field of Search ..................................... 429/233, 234, 429/235, 236, 237, 245, 209; 29/2

[56] References Cited

U.S. PATENT DOCUMENTS

| | | | |
|---|---|---|---|
| 2,251,913 | 8/1941 | Brennan | 429/236 X |
| 3,926,671 | 12/1975 | Gutjahr et al. | 29/623.5 X |
| 4,251,603 | 2/1981 | Matsumoto et al. | 429/235 X |
| 5,077,153 | 12/1991 | Grange-Cossou et al. | 429/241 X |
| 5,578,397 | 11/1996 | Verhoog et al. | 429/235 X |

FOREIGN PATENT DOCUMENTS

| | | |
|---|---|---|
| 0657950 | 6/1995 | European Pat. Off. |
| 1031445 | 6/1953 | France . |
| 1231143 | 9/1960 | France . |
| 2232838 | 1/1975 | France . |
| 2711016 | 4/1995 | France . |
| 17554 | 9/1963 | Japan . |
| 1375438 | 11/1974 | United Kingdom . |

OTHER PUBLICATIONS

Patent Abstracts of Japan, vol. 006, No. 103, Jun. 12, 1982 & JP-A-57 034665 Matsushita Electric Ind. Co., Ltd. Feb. 25, 1982—Abstract.
Patent Abstracts of Japan,,vol. 014, No. 028, Jan. 19, 1990 & JP-A-01 265452 Toshiba Electric Co.,Ltd. Oct. 23, 1989—Abstract.
Patent Abstracts of Japan, Vo.,013, No. 08 Dec. 23, 1989 & JP-A-63-261673 Sanyo Electric Co., Ltd. Dec. 15, 1988 Abstract.
Patent Abstracts of Japan vol. 005, No. 078, May 22, 1981 & JP-A-56 026367 Yuasa Battery Co., Ltr. Mar. 13, 1981 Abstract.
Patent Abstract of Japan, 012, No. 007 Jan. 9, 1988 & JP-A-62 165862 Sanyo Electric Co., Ltd. Jul. 22, 1987 Abstract.
Patent Abstracts of Japan vol. 006, No. 147, Aug. 6, 1982 & JP-A-57 072269 Yuasa Battery Co., Ltd. May 6, 1982 Abstract.
Derwent Publication, Database WPI Week 7913,London (1pg) Patent Abstracts of Japan, JP-A-54 022 534 (1 pg) Feb. 20, 1979.
Patent Abstracts of Japan, JP-A-58 117646 Oct. 7, 1983 and Abstract Japan Jul. 13, 1983 Matsushita Denki Sangyo (2 pgs.).
Patent Abstracts of Japan, vol. 012, No. 115, Apr. 12, 1988 & JP-A-62 243245 Shin Kobe Electric Mach Co., Ltd.

*Primary Examiner*—John S. Maples
*Attorney, Agent, or Firm*—Bierman, Muserlian and Lucas

[57] ABSTRACT

An electrode plate for a battery is constructed from a porous metal body having at least one low-porosity part selectively arranged therein. A porous resin core is coated with a paste having a metal component, passed through rolls provided with at least one recess to thereby form at least one low-porosity part and sintered. The resultant electrode plate for battery is not only ensured with respect to strength and capable of improving battery performance but also advantageous in that it is available at lowered cost and free from apprehension of supply of raw materials.

7 Claims, 5 Drawing Sheets

ELECTRODE PLATE FOR BATTERY

BACKGROUND OF THE INVENTION

1. Field of the Invention

The present invention relates to an electrode plate suitable for use in alkali storage batteries such as nickel-cadmium, nickel-zinc and nickel-hydrogen batteries and in a secondary Li battery.

2. Description of the Prior Art

Lead and alkali storage batteries are used as power sources in various fields. Of these, a small-size alkali storage battery has widely been used in various portable devices and a large-size alkali storage battery in industrial uses because of the anticipated high reliability of the alkali storage batteries and because of the possibility of miniaturization and weight reduction thereof. In this alkali storage battery, the negative electrode is composed of not only cadmium but also zinc, iron or hydrogen. However, the positive electrode is mostly composed of nickel although positive electrodes respectively composed of air and silver oxide have been studied in some proposals. The use of the alkali storage battery has been expanded in accordance with the improvement of properties attained by the change from the pocket type to the sintering type and in accordance with the realization of sealing.

However, in the conventional powder sintering method, an increase of the plate porosity to 85% or higher leads to a substantial deterioration of strength, so that the filling of the active substance encounters a limit. Thus, the increase of the battery capacity encounters a limit. In substitution for the sintered plate, foamed or fibrous plates each having a porosity increased to 90% or higher have been proposed, some of which have been put into practical use. In this connection, processes have long been proposed in which a foamed resin is coated with a metal paste and sintered to thereby obtain a sintered body having a high porosity. For example, Japanese Patent Publication No. 17554/1963 disclosed a process comprising rendering metal powder muddy, impregnating a urethane foam with the muddy metal powder, carbonizing the resin in hydrogen and converting the metal to the half molten state, thereby obtaining a porous metal body.

For example, a porous metal body having a porosity as high as at least 90% can be produced by providing powdery nickel as metal powder in the form of a paste, impregnating a foamed resin with the paste and conducting sintering in hydrogen, thereby enabling produbtion of a high-capacity electrode as a battery base. However, the resultant porous metal body is poor in mechanical strength, for example, tensile strength because of the high porosity and because of the absence of a porous core material such as punching metal employed in the conventional powder sintering product.

Therefore, when the porous metal body is filled with an active substance in a hoop-like form, it has the danger of being deformed or broken by the load applied during carriage thereof. Further, the electric resistance of the resultant base is slightly increased, so that a voltage drop is caused to occur especially at the time of high discharge.

Generally, a terminal strip is secured to the electrode by spot welding. The high porosity and the absence of any core material increase the probability of breakage of the spot-welded part. Further, in the method known as the tabless method in which a circular terminal is welded to an upper part of an electrode with a cylindrical structure, the upper part of the electrode has such a poor strength that this arrangement can hardly be employed.

In a large-size battery for use in, for example, an electric vehicle, its large electrode surface area increases the electric resistance of the electrode plate and hence increases the voltage drop at the time of high-rate discharge, so that the battery encounters a limit in available output. Moreover, a voltage distribution occurs in the electrode surface with the result that the charge efficiency is deteriorated.

Although the contribution of the use of the porous Ni body as an electrode plate of battery toward the enhancement of the battery capacity is great as mentioned above in the prior art section, metallic nickel is expensive and further its resource has a problem since the consumption thereof is foreseen to be enormous when the above alkali storage batteries are employed in electric vehicles, etc. in the future.

SUMMARY OF THE INVENTION

In the above situation, an object of the present invention is to provide an electrode plate for use in a battery which improves battery characteristics while ensuring its strength, thereby resolving the above drawbacks. Another object of the present invention is to provide an electrode plate for use in a battery which improves battery characteristics while ensuring its strength and which is available at,a lowered cost and free from apprehension of supply of its raw material.

The inventors have made extensive investigations. As a result, they have found that it is effective to use a porous metal body having at least one low-porosity part selectively arranged therein as an electrode plate for battery and thus have arrived at the present invention.

That is, the present invention relates to (1) an electrode plate for use in a battery, which is an electrode plate retaining an active substance for use as a battery collector and which comprises a planar porous metal body having at least one low-porosity part selectively arranged therein, (2) a process for producing an electrode plate for use in a battery, which comprises impregnating a skeleton of a porous resin core with a paste composed mainly of powder of at least one selected from the group consisting of metals, alloys and metallic compounds and a binder to thereby obtain a paste-coated skeleton and passing the paste-coated skeleton between rolls provided with at least one recess to thereby selectively form at least one low-porosity part, followed by heating at a temperature not lower than that at which the metal component is sintered to thereby obtain a sheet-like porous metal body of three-dimensional network, (3) a process for producing an electrode plate for use in a battery, which comprises impregnating a skeleton of a porous resin core with a paste composed mainly of powdery Fe and a binder to thereby obtain a paste-coated skeleton and passing the paste-coated skeleton between rolls provided with at least one recess to thereby selectively form at least one low-porosity part, followed by heating at a temperature not lower than that at which Fe is sintered to thereby obtain a sheet-like porous body of Fe, this sheet-like porous body being electroplated with Ni, and (4) a process for producing an electrode plate for use in a battery, which comprises impregnating a skeleton of a porous resin core with a paste composed mainly of a binder of an organic resin to thereby obtain a paste-coated skeleton, passing the paste-coated skeleton between rolls provided with at least one recess to thereby selectively vary the amount of coated paste and causing powdery Fe to stick thereto, followed by heating at a temperature not lower than that at which Fe is sintered to thereby obtain a sheet-like porous body of Fe, this sheet-like porous body being electroplated with Ni.

DETAILED DESCRIPTION OF THE PREFERRED EMBODIMENTS

Figure 1:
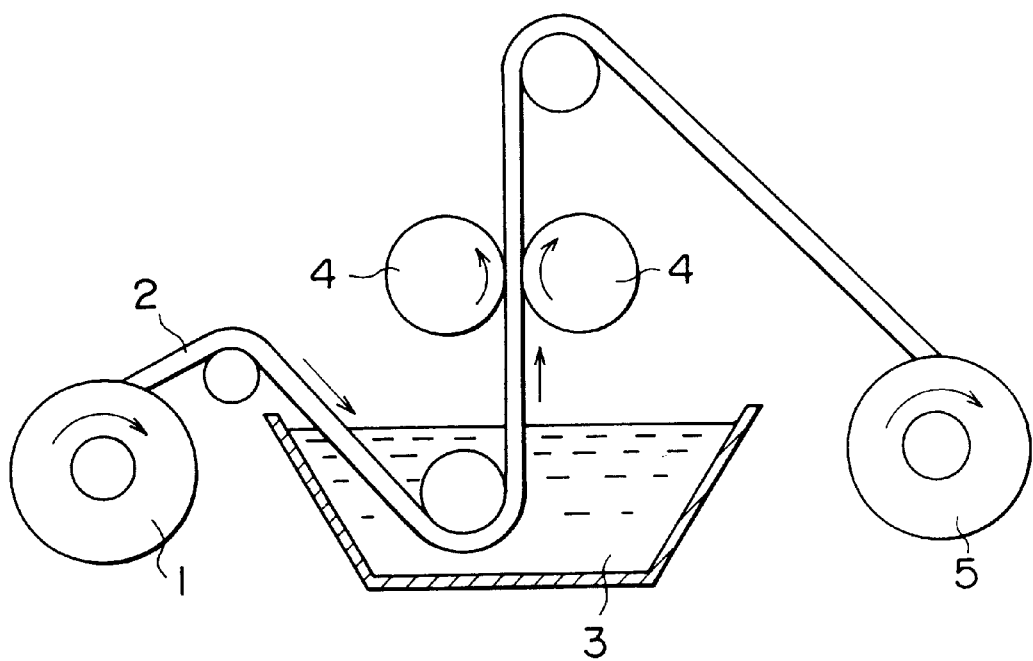
FIG. 1 is a diagrammatic explanatory view of an apparatus suitable for use in the production of the electrode plate for battery according to the present invention.

In the present invention, it is requisite that the low-porosity part be selectively arranged in the plate, as mentioned above. It is preferred that the low-porosity part be arranged at a site of the plate where a high strength is especially required.

Not only is an increase of the battery capacity realized but also the mechanical strength is ensured by causing, for example, the part of the electrode plate to be welded to a terminal and the peripheral part of the electrode plate to have low porosities while causing the other parts where the active substance is filled and retained to have high porosities. In the present invention, it is preferred that at the principal part of the electrode plate the porosity be as high as 90 to 97% for enabling attainment of high capacity and that at the low-porosity part, although it is satisfactory that the porosity there is lower than that at the principal part because the function of the low-porosity part is to improve the strength and conductivity, the porosity range be from 50 to 80% from the viewpoint of easiness in production and obtained properties. Further, for facilitating the terminal welding, it is preferred that the low-porosity part be previously pressed. The ratio of the surface area of the low-porosity part to the entire surface area of the electrode plate is regulated to generally 30% or below and preferably 10% or below from the viewpoint that the object of the low-porosity part is to improve the conductivity and mechanical strength of the electrode plate and that it is desired to increase the amount of the active substance retained in the battery.

The above electrode plate can be fabricated by a process comprising impregnating a skeleton of a porous resin core with a paste composed mainly of powder of at least one selected from the group consisting of metals, alloys and metallic compounds and a binder to thereby obtain a paste-coated skeleton and passing the paste-coated skeleton between rolls provided with at least one recess to thereby form at least one low-porosity part, followed by heating at a temperature not lower than that at which the metal component is sintered to thereby obtain a sheet-like porous metal body of three-dimensional network, and finally molding the sheet-like porous metal body. In this process, use is made of rolls provided with at least one groove-like or spot-like recess.

Although the above porous resin core is not particularly limited and any porous resin can be used without exception, it is preferred to employ especially polyurethane and polyolefin foams. The paste used to impregnate the porous resin core is composed mainly of powder of at least one selected from among metals, alloys and metallic compounds, and a binder. Although the above metal component powder is not particularly limited as long as it is sintered in the subsequent step and can compose a porous body for electrode plate as a collector, it is preferred to employ Ni, Al, Cu, Ti or the like and these metals may also be used in the form of alloy, compound or mixture thereof. An acrylic or phenol resin is preferably used as the binder. In addition, an additive such as carboxycellulose and a diluent are added to the paste.

As mentioned above, the electrode plate for use in a battery according to the present invention can be obtained by immersing a porous resin core skeleton in a paste composed mainly of the foregoing metal component powder and a binder, removing excess slurry coating by means of squeeze rolls and thereafter conducting heat treatment.

When a recess is locally provided on the squeeze rolls, a greater amount of the paste remains at the part corresponding to the recess, so that a low-porosity part results after the heat treatment.

In the present invention, the porosity of the low-porosity part formed by the above procedure can range from 50 to 80%, so that a low porosity part can be formed without coating that part with the paste in a particularly increased thickness to thereby increase the thickness of the electrode plate, thereby enabling improvement of not only the strength but also the conductivity of the electrode plate. The above procedure leads to the formation of the high-porosity part in continuity with the low-porosity part in the same planar electrode plate surface. This avoids formation of a discontinuous boundary and has the effect of preventing stress concentration.

In the present invention, the formation of the high-porosity part in continuity with the low-porosity part is attributed to the feed of the paste from the paste-enriched site corresponding to the recess to the surrounding part after the passage through the squeeze rolls, resulting in the formation of an intermediate zone where the porosity is gradually increased to continue to the high-porosity part around the low-porosity part.

The breakage of the electrode at the welding of a terminal can be prevented by forming the low-porosity part at an edge of the electrode plate and pressing the part after the sintering to thereby increase the strength thereof.

In the present invention, the low-porosity part is formed by the recess of the squeeze rolls. Thus, the low-porosity part of any arbitrary configuration can be disposed at any arbitrary position of the electrode plate for battery by regulating the configuration of the recess of the roll and the position of the recess on the roll.

In another aspect of the present invention, the porous metal body composing the electrode plate can have an Fe/Ni two-layer structure. Specifically, this porous metal body has an Fe/Ni two-layer structure having its skeletal internal part composed of Fe and having a coating layer of Ni formed at its surface part. When this porous metal body is put into practical use, the electrode plate is available at lowered cost and is free from apprehension of supply of its raw material to thereby resolve the problem of resource in the use of the alkali storage battery whose enormous demand is anticipated to occur for electric vehicles and other applications in the future by virtue of the structure of the porous body comprising Fe cheap and abundant in resource as a base layer and, disposed at its surface, a corrosion-resistant Ni coating film.

In the porous metal body according to the above aspect, for dealing with the problem that Fe undergoes oxidation-reduction in the alkali electrolyte of the battery so as to be electrochemically unstable, the surface of Fe is coated with Ni to thereby increase the corrosion resistance of the electrode with the result that the durability characteristics of the battery can be improved. Further, the electric resistance of the electrode plate exerts marked influence on the battery performance, especially, the output property, so that a low electric resistance is realized by regulating the purity of the Fe composing the skeleton of the porous body to 98% or higher.

The Fe content of the Ni layer is preferred to be 10% by weight or below from the above viewpoint of electric resistance and corrosion. It is still preferred to regulate it to 4% by weight or below for reducing the electric resistance. The average thickness of the Ni coating layer is preferred to range from 0.1 $\mu$m to 10 $\mu$m. The corrosion resistance thereof is not satisfactory at thicknesses of less than 0.1 $\mu$m. On the other hand, when the thickness thereof exceeds 10 $\mu$m, the consumption of Ni is increased to thereby making impossible the desired supply of cheap material and resolution of the resource problem.

The electrode plate according to the above aspect can be produced by a process comprising impregnating a skeleton of a porous resin core with a paste composed mainly of powdery Fe and a binder to thereby obtain a paste-coated skeleton and passing the paste-coated skeleton between rolls provided with at least one recess to thereby form at least one low-porosity part, followed by heating at a temperature not lower than that at which Fe is sintered to thereby obtain a sheet-like porous body of Fe, this sheet-like porous body being electroplated with Ni. In this process, use is made of rolls provided with at least one groove-like or spot-like recess.

Also, the above electrode plate can be produced by a process comprising impregnating a skeleton of a porous resin core with a paste composed mainly of a binder of an organic resin to thereby obtain a paste-coated skeleton, passing the paste-coated skeleton between rolls provided with at least one recess to thereby selectively vary the amount of coated paste and causing powdery Fe to stick thereto, followed by heating at a temperature not lower than that at which Fe is sintered to thereby obtain a sheet-like porous body of Fe, this sheet-like porous body being electroplated with Ni.

The Ni coating provided at the surface of the Fe has very excellent resistance to corrosion caused by a strongly alkali solution put in the alkali storage battery, thereby enabling stable maintenance of the porous metal body as the electrode plate inside the battery. With respect to the electrode plate for battery, its electric resistance has marked influence on the battery performance, so that it is requisite that the purity of the Fe be high because a fall of the purity of the Fe leads to an increase of the electric resistance. When the purity is at least 98%, an electric resistance nearly equal to that of pure iron can be obtained.

The coating layer of Ni is required to minimize the diffusion of the Fe composing the base layer from the view-point of two matters, i.e., the corrosion and electric resistances thereof in the alkali electrolyte. When the Fe diffusion is on a high level, not only is the corrosion resistance deteriorated but also the electric resistance thereof is increased.

The low-porosity part can be provided in the above porous metal body having the Fe/Ni two-layer structure in the same manner as described before.

That is, the electrode plate for use in a battery according to the present invention can be obtained by immersing a porous resin core skeleton in a paste composed mainly of powdery Fe and a binder, removing excess slurry coating by means of squeeze rolls and thereafter conducting heat treatment. In this process, when a recess is locally provided on the squeeze rolls, a greater amount of the paste remains at the part corresponding to the recess, so that a low-porosity part results after the heat treatment.

When a paste composed mainly of a binder and not containing powdery Fe is applied in locally excess amounts in the same manner as above, followed by application of powdery Fe to the porous resin by spray or the like, the part where excess paste has been applied has a greater amount of powdery Fe adhering thereto, thereby leading to formation of a low-porosity part.

A diagrammatic view of an apparatus suitable for use in the production of the electrode plate for battery according to the present invention is shown in FIG. 1. In FIG. 1, numeral 1 denotes a roll of polyurethane foam sheet, numeral 2 a polyurethane foam sheet, numeral 3 a paste, numeral 4 squeeze rolls and numeral 5 a take-up roll.

Figure 2:
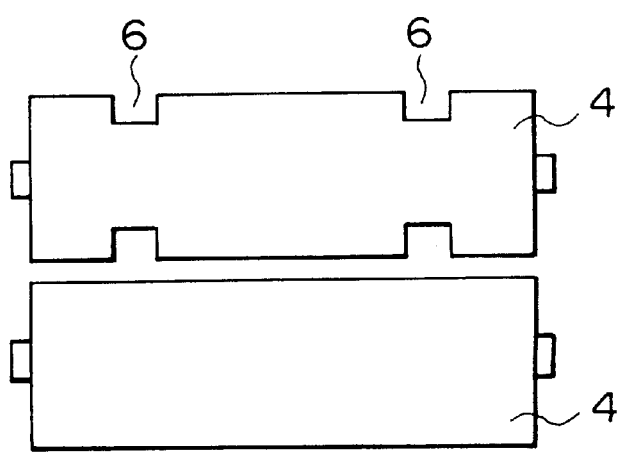
FIG. 2 is an explanatory view of a form of squeeze rolls suitable for use in the present invention.
Figure 3:
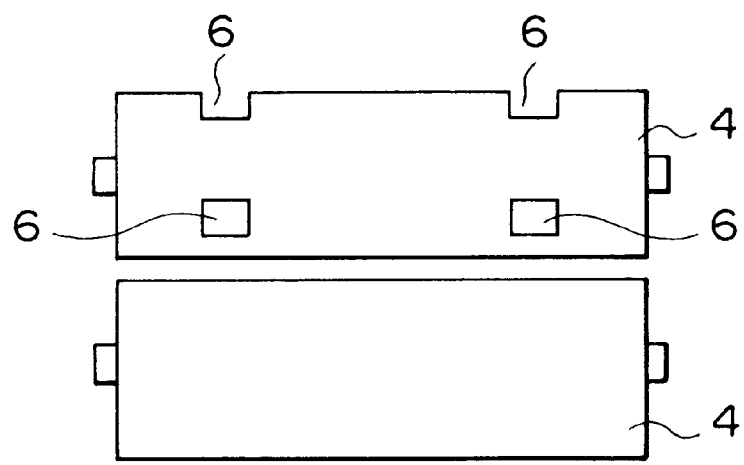
FIG. 3 is an explanatory view of another form thereof.
Figure 4:
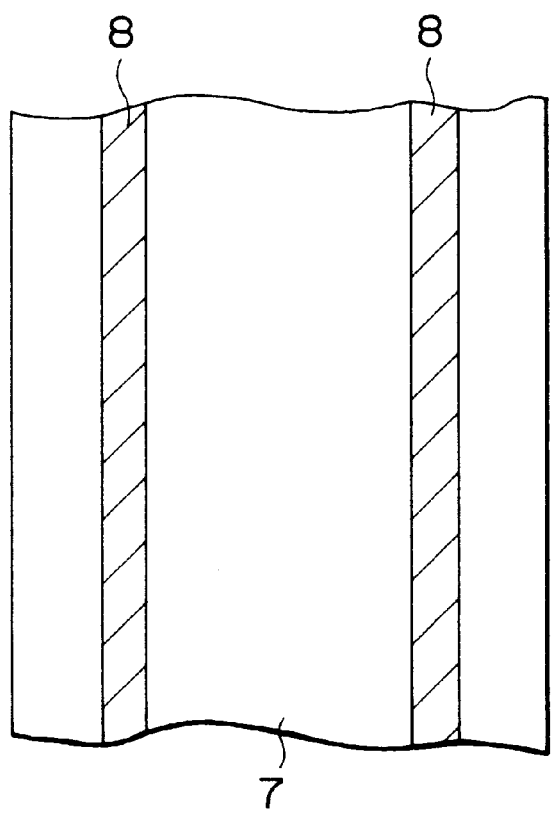
FIG. 4 is an explanatory view of a form of a porous metal sheet.
Figure 5:
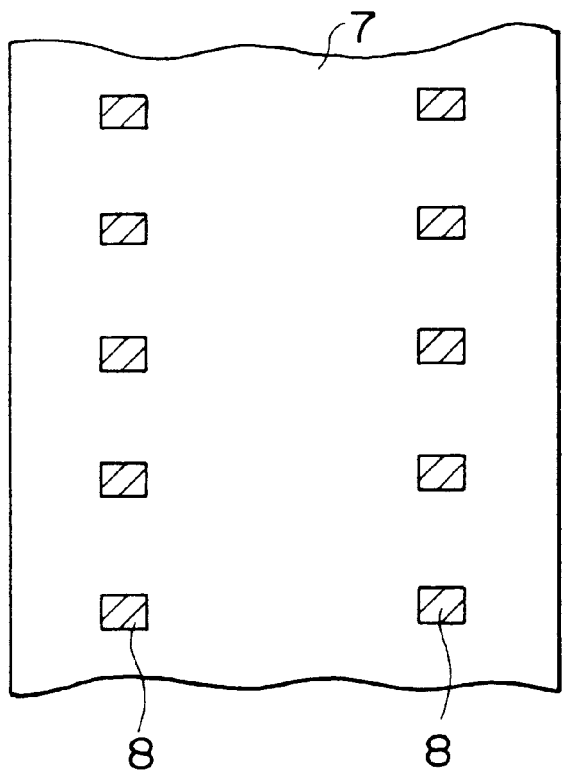
FIG. 5 is an explanatory view of another form thereof.

FIGS. 2 and 3 illustrate varied forms of squeeze rolls. In FIG. 2, groove-like recesses 6 are provided each in the entire circumference of a roll. In FIG. 3, recesses are arranged in spot patterns. The use of the rolls of FIG. 2 forms a porous metal sheet having the structure shown in FIG. 4. The use of the squeeze rolls of FIG. 3 forms a porous metal sheet having the structure shown in FIG. 5. In FIGS. 4 and 5, numeral 7 denotes a high-porosity part and numeral 8 a low-porosity part formed by the recess 6.

Figure 6:
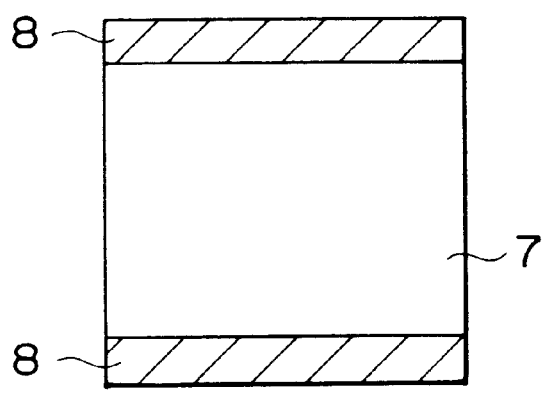
FIG. 6 is an explanatory view of a form of a spiral electrode plate shaped from the porous metal sheet of FIG. 4.
Figure 7:
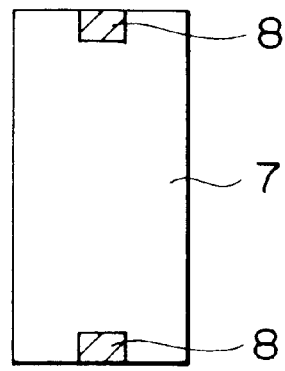
FIG. 7 is an explanatory view of another form of an electrode plate shaped from the porous metal sheet of FIG. 5.
Figure 8:
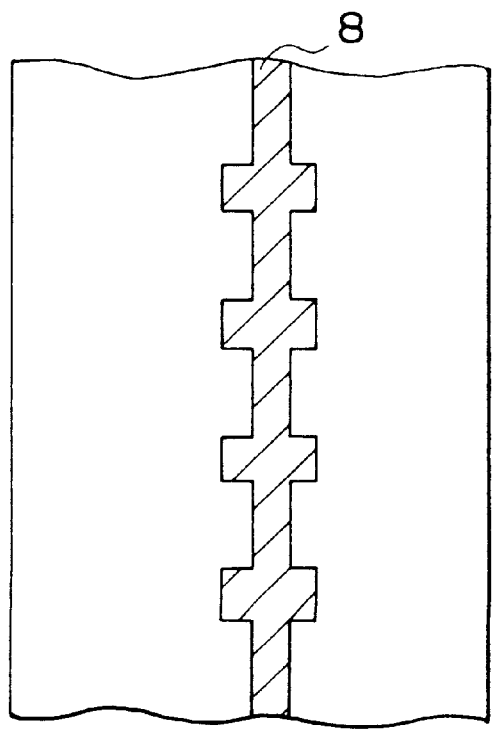
FIG. 8 is an explanatory view of still another form of a porous metal sheet.
Figure 9:
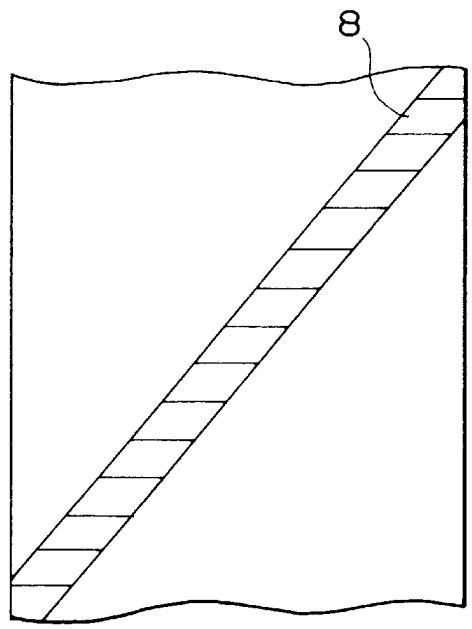
FIG. 9 is an explanatory view of a further form thereof.
Figure 10:
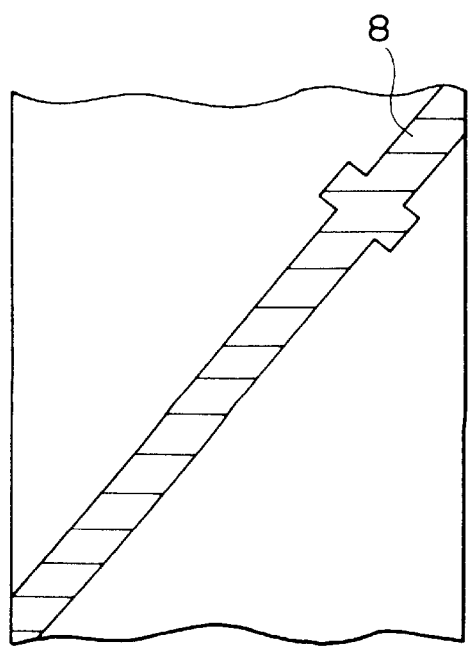
FIG. 10 is an explanatory view of still a further form thereof.

The porous metal sheet shown in FIG. 4, even when loaded, for example, in hoop-like form with an active substance, can be free from the deformation or breakage by the load applied during the carriage thereof. Further, the conductivity thereof can also be improved. When this porous metal sheet is applied to a spiral electrode, it is shaped as shown in FIG. 6 and its low-porosity part 8 is used as a tabless terminal mounting part. Furthermore, the porous metal sheet provided with spot-like low-porosity parts as shown in FIG. 5 is suitable for use in an electrode in which the sheet is finally shaped as shown in FIG. 7 and in which lead terminals are spot welded to those parts. The combination of a continuous recess and spot-like recesses leads to the formation of an electrode plate as shown in FIG. 8. Providing the squeeze rolls with a diagonal recess makes it possible to form a diagonal low-porosity part as shown in FIG. 9. In this case, the diagonal recess is provided together with spot-like recesses to the formation of a diagonal low-porosity part as shown in FIG. 10. This is especially suitable for improving the conductivity of a flat plate electrode of large surface area at a small proportion of low-porosity part. On the premise of a mass production, it is preferred to employ a wide foamed resin and cut it into an electrode configuration in any of the above processes.

The present invention will be described in greater detail with reference to the following

EXAMPLES.

Example 1

50% by weight of nickel carbonyl powder having an average particle size of 2.8 μm, 10% by weight of acrylic resin, 2% by weight of carboxymethylcellulose and 38% by weight of water were blended together into a paste. A polyurethane foam of 1.8 mm in thickness, 60 cm in width and 1 m in length having about 50 pores per inch was provided as a foamed resin. This polyurethane foam was coated with the paste by the use of the apparatus shown in FIG. 1 in which the polyurethane foam was immersed in the paste and in which excess paste was removed by means of squeeze rolls.

The employed squeeze rolls included a roll as shown in FIG. 2 which had recesses 6 arranged a little to the center. Thus, the foamed resin sheet of 60 cm in width had two low-porosity parts formed by the recesses, which were disposed at the space of 20 cm and each had a width of 10 mm. After the coating with the paste, the coated polyurethane foam was dried and the temperature was raised in a stream of hydrogen at a rate of 30° C./min to 1100° C., at which the dried foam was sintered for 10 min. Thus, the resultant high-porosity and low-porosity parts had average porosities of 96 and 70%, respectively. The resultant electrode plate was designated A. For comparison, an electrode plate base having no low-porosity part was provided and designated B.

Each of the plates as supports was loaded in hoop-like form with an active substance (nickel electrode), and the carriage-caused breakage conditions were compared between the electrode plates. Specifically, 87 parts by weight of commercially available powdery nickel hydroxide, 8 parts by weight of powdery cobalt oxide, 3 parts by weight of powdery nickel as a conductor and 2 parts by weight of polyvinyl alcohol were blended together into a paste. The polyvinyl alcohol was added as a 6% (by weight) aqueous polyvinyl alcohol solution. This paste was filled under pressure into each porous metal body. This operation was repeated in varied carriage speeds.

The results were as follows. Although any problem such as breakage did not occur when the carriage speed was not greater than 80 mm/min, at 160 mm/min, the electrode plate B suffered from the occurrence of broken parts at average intervals of 1 m while the electrode plate A was free from any abnormality. At 240 mm/min, the electrode plate B suffered from the occurrence of broken parts at average intervals of 30 cm while the base A was still free from any abnormality.

Example 2

The following describes an electrode produced by a process in which low-porosity parts as shown in FIG. 5 were formed with the use of squeeze rolls provided with spot-like recesses 6 as shown in FIG. 3 and sintering was conducted in the same manners as in Example 1, thereby obtaining an electrode plate, and in which the low-porosity parts were pressed to which lead terminals were spot welded. Specifically, use was made of squeeze rolls provided with recesses each of 0.5 mm in depth, 5 mm in width and 12 mm in length to thereby obtain two electrode plates. Thus, after cutting, each low-porosity part had a width of 5 mm and a length of 6 mm.

The porosities of the high-porosity and low-porosity parts were 96% and 57%, respectively. Each low-porosity part was pressed at 500 kg/cm². The resultant electrode plate was cut into a width of 33 mm and a length of 180 mm.

A nickel electrode was produced from the above plate as a support. The support was loaded with an active substance composed mainly of nickel hydroxide in the same manner as in Example 1. After the filling of the paste, the surface was smoothed and dried at 120° C. for 1 hr. The obtained electrode was passed through a roll press, which had been subjected to an embossing finish, thrice to thereby adjust the thickness to 0.7 mm. A nickel plate of 0.2 mm in thickness and 5 mm in width was spot welded to the low-porosity part. The resultant electrode was designated C. For comparison, the electrode provided with no low-porosity part was prepared and designated D. At this spot welding, although no welding failure occurred per 100 pieces with respect to the electrode C of the present invention, 8 pieces suffered from terminal breakage disenabling use thereof per 100 pieces with respect to the electrode D.

Example 3

The following describes a flat plate electrode produced by a process in which a low-porosity part as shown in FIG. 10 was formed with the use of squeeze rolls provided with recess 6 composed of a combination of a diagonal continuous recess and spot-like recesses and sintering was conducted in the same manners as in Example 1, thereby obtaining an electrode plate, and in which the spot-like low-porosity parts were pressed to which lead terminals were spot welded. Specifically, the electrode size was 250 mm in longitudinal length, 200 mm in lateral width and 0.7 mm in thickness. An upper edge thereof was provided with a low-porosity part of 15 mm in width and 8 mm in length for use in spot welding. Further, a low-porosity part of 3 mm in width directed from this upper edge to the lower opposite edge was disposed. The porosities of the high-porosity and low-porosity parts were 96% and 67%, respectively. The low-porosity part was pressed at 500 kg/cm² for use in spot welding.

A nickel electrode was produced with the use of the resultant support. The support was loaded with an active substance composed mainly of nickel hydroxide in the same manner as in Example 1. After the filling of the paste, the surface was smoothed and dried at 120° C. for 1 hr. The obtained electrode was pressed at 1 ton/cm² to thereby adjust the thickness to 0.7 mm. A nickel plate of 0.3 mm in thickness and 13 mm in width was spot welded to the terminal zone of the low-porosity part. The resultant electrode was designated E. For comparison, an electrode provided with no low-porosity part was prepared and designated F.

Each rectangular sealed nickel-hydrogen battery was prepared by assembling 5 nickel electrodes obtained in the above manner, 5 conventional hydrogen occlusion alloy electrodes of the MmNi (misch metal) type as counter electrodes and hydrophilicity-endowed nonwoven polypropylene separators. The employed electrolyte was obtained by dissolving lithium hydroxide in a concentration of 25 g/l, in an aqueous potassium hydroxide solution of 1.25 in specific gravity.

With respect to each battery, the discharge voltage and capacity were measured at discharge currents of 15 A and 150 A. The results are given in Table 1.

TABLE 1

Table Comparison of properties between both batteries

| Battery No. | 15A discharge | | 150A discharge | |
| --- | --- | --- | --- | --- |
| | V | Ah | V | Ah |
| E | 1.23 | 102 | 1.14 | 97 |
| F | 1.22 | 106 | 1.11 | 83 |

Electrode E was especially excellent in high discharge characteristics as apparent from the results of Table 1.

Example 4

50% by weight of powdery Fe having an average particle size of 28 µm, 10% by weight of phenolic resin, 2% by weight of carboxymethylcellulose and 38% by weight of water were blended together into a paste. Polyurethane foam of 1.8 mm in thickness, 60 cm in width and 1 m in length having about 50 pores per inch was provided as a foamed resin. This polyurethane foam was coated with the paste using the apparatus as illustrated in FIG. 1 in which the polyurethane foam was immersed in the paste and in which excess paste was removed by means of squeeze rolls. A foamed sintered body of Fe is obtained by drying the paste-coated polyurethane foam and heating the dried foam in hydrogen. Further, an electrode plate composed of two layers of Fe/Ni and locally having low-porosity parts can be prepared by electroplating the above porous body of Fe with Ni.

The above foamed sintered body can be provided with any of various low-porosity parts by changing the structure of the squeeze rolls 4 of the apparatus of FIG. 1. For example, referring to FIG. 2, the squeeze rolls 1 are provided with recesses 6 over the entire circumference of one of the squeeze rolls 1. This leads to formation of a porous metal body as shown in FIG. 4. In FIG. 4, numeral 7 denotes a high-porosity part and numeral 8 a low-porosity part formed by the recess 6 of FIG. 2. This porous metal body, even when loaded, for example, in hoop-like form with an active substance, can be free from the deformation or breakage by the load applied during the carriage thereof. Further, the conductivity thereof can also be improved. Moreover, providing spot-like recesses 6 as shown in FIG. 3 leads to formation of low-porosity parts as shown in FIG. 5. Finally molding the porous metal body into a configuration of FIG. 7 renders the above parts suitable in use an electrode in which lead terminals are spot welded thereto. Furthermore, the combination of a continuous recess and spot-like recesses leads to the formation of an electrode plate as shown in FIG. 8. Providing the squeeze rolls with a diagonal recess leads to the formation of a diagonal low-porosity part as shown in FIG. 10. This is especially suitable for improving the conductivity of a flat plate electrode of large surface area at a small proportion of low-porosity part. On the premise of a mass production, it is preferred to employ a wide foamed resin and cut it into an electrode configuration in any of the above processes.

Example 5

60% by weight of acrylic resin and 40% by weight of water were blended together into a paste. Polyurethane foam of 2.0 mm in thickness, 60 cm in width and 1 m in length having about 40 pores per inch was provided as a foamed resin. This polyurethane foam was coated with the paste using the apparatus illustrated in FIG. 1 in which the polyurethane foam was immersed in the paste and in which excess paste was removed by means of squeeze rolls. The paste-coated polyurethane foam was oscillated in powdery Fe having an average particle size of 40 µm, thereby causing the Fe powder to adhere to the polyurethane skeleton. Subsequently, heating of the product in hydrogen produces a foamed sintered body of Fe. Further, an electrode plate composed of two layers of Fe/Ni and having low-porosity parts selectively arranged can be prepared by electroplating the above porous body of Fe with Ni.

Electrode plates having low-porosity parts selectively arranged as shown in FIGS. 4, 5, 7 and 10 can be formed by changing the structure of the squeeze rolls in the same manner as in Example 4.

Example 6

In the simplest mode, the recesses 6 of FIG. 2 were formed in the center and the foamed resin was loaded in a hoop-like form with the active substance to thereby compare carriage-caused breakage conditions between electrode plates. Specifically, the foamed resin of 60 cm in width had two low-porosity parts formed by the recesses, which were disposed at the space of 20 cm and each had a width of 10 mm. After the coating with the paste of Example 4, the temperature was raised in a stream of hydrogen at a rate of 30° C./min to 1300° C., at which the coated foam was sintered for 10 min. Thus, the resultant high-porosity and low-porosity parts had average porosities of 96 and 70%, respectively. Further, Ni plating was carried out at a current density of 10 A/dm$^2$ in the Watts bath for Ni electroplating, thereby obtaining an Ni coating of 2 µm in average thickness. This electrode plate was designated A. For comparison, the same Ni coating was formed on a foam provided with no low-porosity part to thereby obtain an electrode plate, which was designated B.

The following describes in detail a nickel electrode as an embodiment in which each support is employed. Specifically, 87 parts by weight of commercially available powdery nickel hydroxide, 8 parts by weight of powdery cobalt oxide, 3 parts by weight of powdery nickel as a conductor and 2 parts by weight of polyvinyl alcohol were blended together into a paste. The polyvinyl alcohol was added as a 6% (by weight) aqueous polyvinyl alcohol solution. This paste was filled under pressure into each porous metal body while carrying the same. This operation was repeated in varied carriage speeds. The results were as follows. Although any problem such as breakage did not occur when the carriage speed was not greater than 80 mm/min, at 150 mm/min, the plate B suffered from the occurrence of broken parts at average intervals of 1 m while the plate A was free from any abnormality. At 260 mm/min, the plate B suffered from the occurrence of broken parts at average intervals of 30 cm while the plate A was still free from any abnormality.

Example 7

The following describes a flat plate electrode provided with a low-porosity part as shown in FIG. 9 which was formed with the use of a diagonally arranged recess 6. Specifically, the electrode size was 350 mm in longitudinal length, 100 mm in lateral width and 1.8 mm in thickness. The porosities of the high-porosity and low-porosity parts were 96% and 58%, respectively. Thus, various electrode plates C1 to C7 specified in Table 2 were provided. Concurrently, an electrode plate provided with no low-porosity part was prepared and designated D1.

TABLE 2

| Sample No. | Purity of Fe skeletal part | Fe content of Ni coating (wt %) | Thickness of Ni coating layer (μm) |
| --- | --- | --- | --- |
| C1 | 99 | 0.2 | 1.5 |
| C2 | 95 | 0.2 | 1.5 |
| C3 | 99 | 1.4 | 1.5 |
| C4 | 99 | 15 | 1.5 |
| C5 | 98 | 0.5 | 0.03 |
| C6 | 98 | 0.5 | 0.4 |
| C7 | 98 | 0.5 | 3.1 |
| D1 | 99 | 0.2 | 1.5 |

A nickel electrode was produced with the use of each of the resultant electrode plates. Each electrode plate was loaded with an active substance composed mainly of nickel hydroxide in the same manner as in Example 6. After the filling of the paste, the surface of the plate was smoothed and dried at 120° C. for 1 hr. The obtained electrode was pressed at 1 ton/cm$^2$ to thereby adjust the thickness to 0.7 mm.

Each rectangular sealed nickel-hydrogen battery was prepared by assembling 6 nickel electrodes obtained in the above manner, 6 conventional hydrogen occlusion alloy electrodes of the MmNi (misch metal nickel) type as counter electrodes and hydrophilicity-endowed nonwoven polypropylene separators. The employed electrolyte was obtained by dissolving lithium hydroxide in a concentration of 20 g/l, in an aqueous potassium hydroxide solution of 1.35 in specific gravity. The resultant batteries were designated C1B to C7B and D1B in correspondence with the electrode plate designations (Sample Nos.) set forth in Table 2.

With respect to each battery, the discharge voltage and capacity were measured at discharge currents of 10 A and 150 A. Further, the capacity retention exhibited after 500 cycles of 10 A discharge was evaluated as a durability test. The results are given in Table 3.

TABLE 3

| Battery No. | 10A discharge | | 150A discharge | | Ratio of capacity retention after 500 cycles |
| --- | --- | --- | --- | --- | --- |
| | V | Ah | V | Ah | |
| C1B | 1.24 | 102 | 1.18 | 100 | 94 |
| C2B | 1.17 | 99 | 1.03 | 92 | 93 |
| C3B | 1.23 | 101 | 1.17 | 99 | 93 |
| C4B | 1.18 | 99 | 1.05 | 91 | 90 |
| C5B | 1.21 | 100 | 1.16 | 98 | 83 |
| C6B | 1.22 | 101 | 1.16 | 99 | 92 |
| C7B | 1.24 | 103 | 1.19 | 101 | 94 |
| D1B | 1.11 | 96 | 0.95 | 78 | 92 |

As apparent from the foregoing, a low-porosity part is selectively formed at a region where high strength is required such as a terminal weld site or an outer periphery in the electrode plate for use in a battery according to the present invention, thereby enabling improvement of the strength of the region. Therefore, welding restraints can be removed, trouble such as breakage at filling of an active substance can be avoided and the battery based on this electrode plate can have improved properties.

In a preferred embodiment of the present invention, the structure of the electrode plate is composed of Fe being cheap and abundant in resource as a base layer and, disposed at its surface, a corrosion-resistant Ni coating film. Therefore, the electrode plate of the present invention is advantageous in that the raw materials are available at lowered cost and are free from apprehension of supply to thereby enable resolving the problem of resource in the use of the alkali storage battery whose enormous demand is anticipated to occur for electric vehicles and other applications in the future.

What is claimed is:

1. An electrode plate for use in a battery, which is an electrode plate retaining an active substance for use as a battery collector and which comprises a planar porous metal body having at least one low-porosity part selectively arranged therein, the porous metal body having been produced by impregnating a skeleton of a porous resin core with a paste composed mainly of powder of at least one member selected from the group consisting of metals, alloys and metallic compounds, and a binder to obtain a paste-coated skeleton and passing the paste-coated skeleton between rolls provided with at least one recess thereby retaining a greater amount of the paste at the part corresponding to the recess of the rolls and thereby selectively forming at least one said low-porosity part, followed by heating at a temperature not lower than that at which the metal component is sintered to obtain a sheet-like porous metal body of three-dimensional network.

2. The electrode plate according to claim 1, wherein the low-porosity part has a porosity of 50 to 80% and the part other than the low-porosity part a porosity of 90 to 97%.

3. The electrode plate according to claim 1, wherein the low-porosity part is in continuity with the part other than the low-porosity part.

4. The electrode plate according to claim 1, wherein the porous metal body has an Fe/Ni two-layer structure having its skeletal internal part composed of Fe and having a coating layer of Ni formed at its surface part.

5. The electrode plate according to claim 4, wherein the Fe skeleton has a purity not lower than 98%.

6. The electrode plate according to claim 4, wherein the coating layer of Ni has an Fe content not higher than 10%.

7. The electrode plate according to claim 4, wherein the coating layer of Ni has an average thickness ranging from 0.1 to 10 μm.

* * * * *